United States Patent [19]

Betts et al.

[11] Patent Number: 4,779,878

[45] Date of Patent: Oct. 25, 1988

[54] TROLLEY BASE WITH HEIGHT ADJUSTER

[75] Inventors: David R. Betts, Kent, England; Kurt Klages, Barntrup, Fed. Rep. of Germany

[73] Assignee: Kentinental Engineering Limited, Kent, United Kingdom

[21] Appl. No.: 41,012

[22] Filed: Apr. 14, 1987

[30] Foreign Application Priority Data

Apr. 15, 1986 [GB] United Kingdom ................. 8609142

[51] Int. Cl.$^4$ ............................................. B62B 3/00
[52] U.S. Cl. ..................................... 280/42; 108/118; 108/147; 248/422; 254/102
[58] Field of Search .................. 269/17; 108/118, 147; 248/422; 280/35, 42, 651; 254/7 C, 102

[56] References Cited

U.S. PATENT DOCUMENTS

| | | | |
|---|---|---|---|
| 1,527,895 | 2/1925 | Mazoch | 248/422 |
| 2,808,303 | 10/1957 | Frank | 108/147 |
| 3,210,846 | 10/1965 | Balkin | 108/147 |
| 3,275,298 | 9/1966 | Hand | 254/45 |
| 4,690,417 | 9/1987 | Betts et al. | 280/40 |

FOREIGN PATENT DOCUMENTS

| | | |
|---|---|---|
| 2117328 | 10/1983 | United Kingdom . |
| 2123761 | 2/1984 | United Kingdom . |
| 2157258 | 10/1985 | United Kingdom . |
| 2184697 | 7/1987 | United Kingdom . |

Primary Examiner—John J. Love
Assistant Examiner—Michael Mar
Attorney, Agent, or Firm—Panitch Schwarze Jacobs & Nadel

[57] ABSTRACT

A trolley base has upright sides, made from frame members and base support members supported on wheels. The upper parts of the sides are slidable in the frame members to give height adjustment. A lifting device comprising an extensible strut, such as a pre-loaded gas strut, mounted in an expansible guide column, is detachably connectible to the base to substantially balance a load on the trolley and allow easy height adjustment with the load in place.

8 Claims, 5 Drawing Sheets

TROLLEY BASE WITH HEIGHT ADJUSTER

BACKGROUND OF THE INVENTION

This invention relates to a trolley base intended for use with a detachable trolley top or pallet for transporting loads. Particularly it relates to a trolley base which can be collapsed or folded for transportation when not loaded.

Trolley bases are known from U.K. Patent Applications Nos. 2123761 and 8531922 which have wheel means on which they can be pushed over the ground in an erected working condition and which are movable by a double folding action between that erected working condition and a folded condition. They are intended particularly, but not exclusively, for moving a heavy object from one support surface into a vehicle for transport to a further situation. With such a trolley the load is wheeled on the trolley to adjacent the back of a car, the load supporting surface or trolley top is moved off the trolley base onto the floor of a car and the base collapsed and also placed in the car; at the other end the base is again erected and the trolley top with the load on it is slid or rolled back on to the base for further transportation on the trolley.

Both these trolley bases have an adjustable height so that the top of the trolley base can be aligned with the support surfaces at the back of the car. However, it is not easy to adjust the height once the load is on the trolley base and if it is required to remove the object to yet another support surface at a different height, problems arise.

One height adjustable trolley base with an attached lifting means is known from U.K. Patent Specification No: 2157258. However, we have found that this type of lifting means is entirely unsatisfactory where a considerable load is on the trolley since it contains no support and guide means and causes bending and twisting of the trolley base.

SUMMARY OF THE INVENTION

An object of the present invention is to provide a trolley base with means whereby its height is adjustable when it has a load thereto.

Accordingly, the present invention provides in combination a foldable trolley base having height adjustable load support means and a lifting attachment, the lifting attachment comprising an expansible guide column, an extensible strut means connected with the column such that extension of the strut expands the column, and detachable fastening means whereby the lifting attachment can be attached to the trolley base in a working position in which it can adjust the height of the load support means with a load thereon and whereby it can be completely detached from the trolley base. Such a lifting apparatus can lift a load on the trolley base without putting unacceptable bending and twisting forces on the base.

Preferably the trolley base has two sides which are spaced apart from one another in an erected working condition of the trolley base and can be moved adjacent one another in a folded condition of the trolley base. With advantage the expansible guide column is arranged to be located substantially in a central plane equidistant between the sides of the trolley base in its erected condition.

In the preferred form the sides of the trolley base are connected by cross members having central portions pivotally connected to one another by a pivot member and the fastening means is adapted to be connected to the pivot member.

Preferably a bridging member is attached to the column and arranged to firmly engage with both sides of the trolley base in the working position. Normally each side of the trolley base has an upper portion and a lower portion telescopically engaging with one another and the lifting means include a first bridging member attached to the column and arranged to firmly engage with both the lower side portions in the working position and a second bridging member attached to the column arranged to engage with and support both the upper side portions in the working condition. This increases the stabilisation of the trolley base.

The strut means may be a gas strut, pre-loaded to substantially support the weight of the load (including the trolley top), for example pre-loaded to + or −10% of the expected load. Alternatively the strut means may comprise interengaging threaded members.

BRIEF DESCRIPTION OF THE DRAWINGS

One embodiment of trolley and trolley base in combination with alternative forms of lifting means, in accordance with the invention will now be described, by way of example only, with reference to the accompanying drawings of which

DETAILED DESCRIPTION OF EMBODIMENTS OF THE INVENTION

Figure 1:
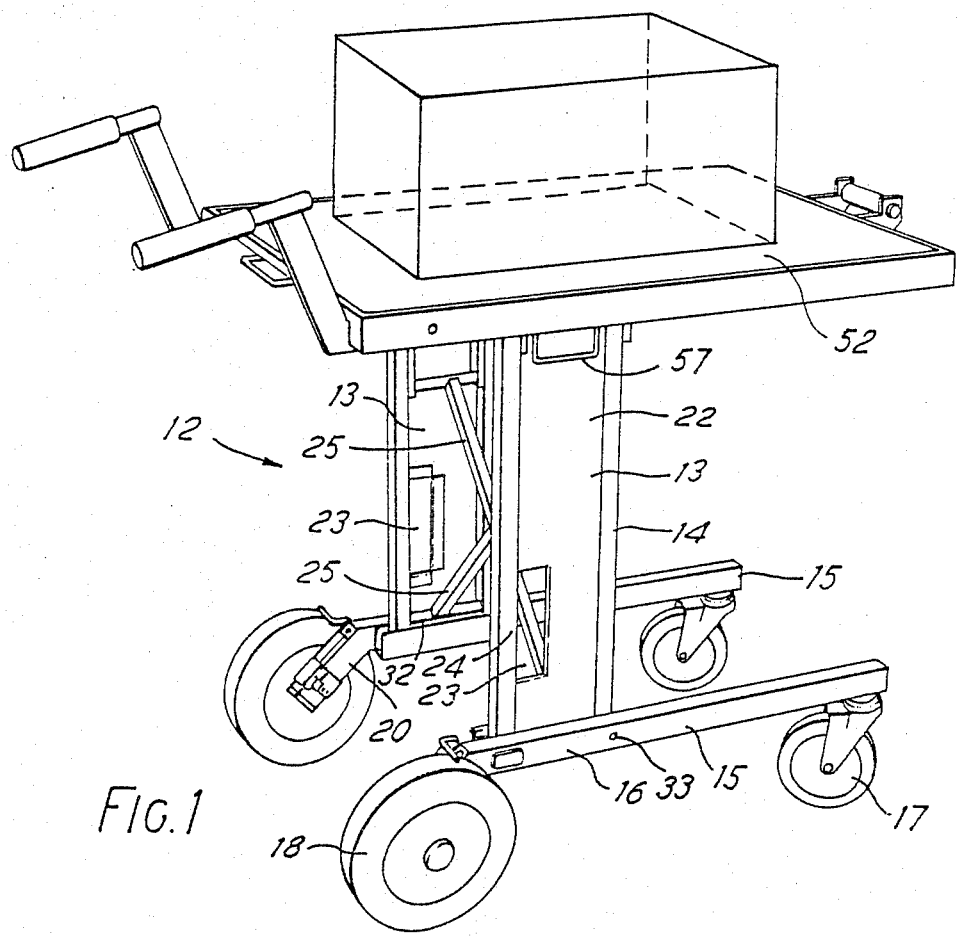
FIG. 1 is a perspective view of a trolley without the lifting means.

The trolley shown in FIG. 1 is similar to that shown in U.S. patent application Ser. No. 823,223 dated 28 Jan. 1986 now U.S. Pat. No. 4,690,417, and comprises a trolley base 12 having a pair of sides 13 each having an upright portion 14 and a base support portion 15. Each base support portion 15 comprises an elongate member 16 in the form of a rectangular sectioned horizontal tube carrying a front wheel member in the form of a castor 17 and a rear wheel member 18 journalled to a downwardly angled portion 20 of the elongate member 16.

Each upright portion 14 is a generally rectangular frame made from square sectioned tubular or channelled elongate members 21 with a side panel 22 (omitted from FIGS. 2 to 5). A part 23 of each side panel 22 is cut away adjacent part 24 of the frame to provide carrying handles for the folded base.

The two upright side portions 14 are connected by cross members 25 pivotally connected by a shouldered bolt 26 adjacent their central portions and having end portions 27, 28 located in channels 29 in the upright frames. The lower end portions 27 are pivotally mounted adjacent the lower parts of the upright portions and the upper end portions 28 are guided for sliding and pivotal movement in the channels to allow the sides to move to a position juxtaposed to one another in the folded condition or to be held rigidly spaced apart in the erected condition. The lower frame member 32 of the upright portion 14 of each side is pivotally secured at 33 to the member 16 so that the upright portions can be pivoted between an upright erected condition and a folded condition in which they lie adjacent the elongate members 16.

Each upright portion 14 is formed from upper and lower parts. The upper part comprises a load supporting bar 51, intended to support and have locked thereto a trolley platform 52, and depending legs 53 which are telescopically slidable in the hollow tubular side frame members 21 of the lower part of the upright portion. The side faces 55 of the legs 53 are formed with a series of vertically spaced holes (not shown) to receive locating pins (not shown) mounted in respective extensions (not shown) on the upright frame members 21. The locating pins at each side are engaged by a common operating handle 57 having its ends pivotally mounted in the extensions so that pivotal movement of the handle engages or releases both pins together allowing adjustment of the height of the support bars 51 and thus the height of the trolley base.

As seen in FIG. 2 to 5 an expansible column 60 comprising a rectangular sectioned outer tube 61 and a similar inner tube 62 slidable therein on ball or roller bearings 58 is adapted to be detachably attached to the trolley base in the longitudinal central plane thereof. Other sectioned columns are possible but they should preferably prevent relative rotation of the inner and outer tubes. The lower part of the outer tube 61 carries a bracket 63 having a keyhole slot 59 shaped to be fitted over the head and on to a shoulder at one end of the pivot bolt 26. The upper part of the outer tube 61 carries a bridge member 64, the angle sectioned ends 65 of which engage against the sides of and rest on the tops of the upper horizontal members 21 of the upright portions 14 and have pins 66 which engage in apertures in those members 21. The inner tube 62 carries a bridge platform 67, the raised side edges 68 of which engage under the support bars 51. The column 60 contains an expansible strut 69 for expanding the column and thus lifting the upper part 51, 53 of each upright side portion.

Figure 2:
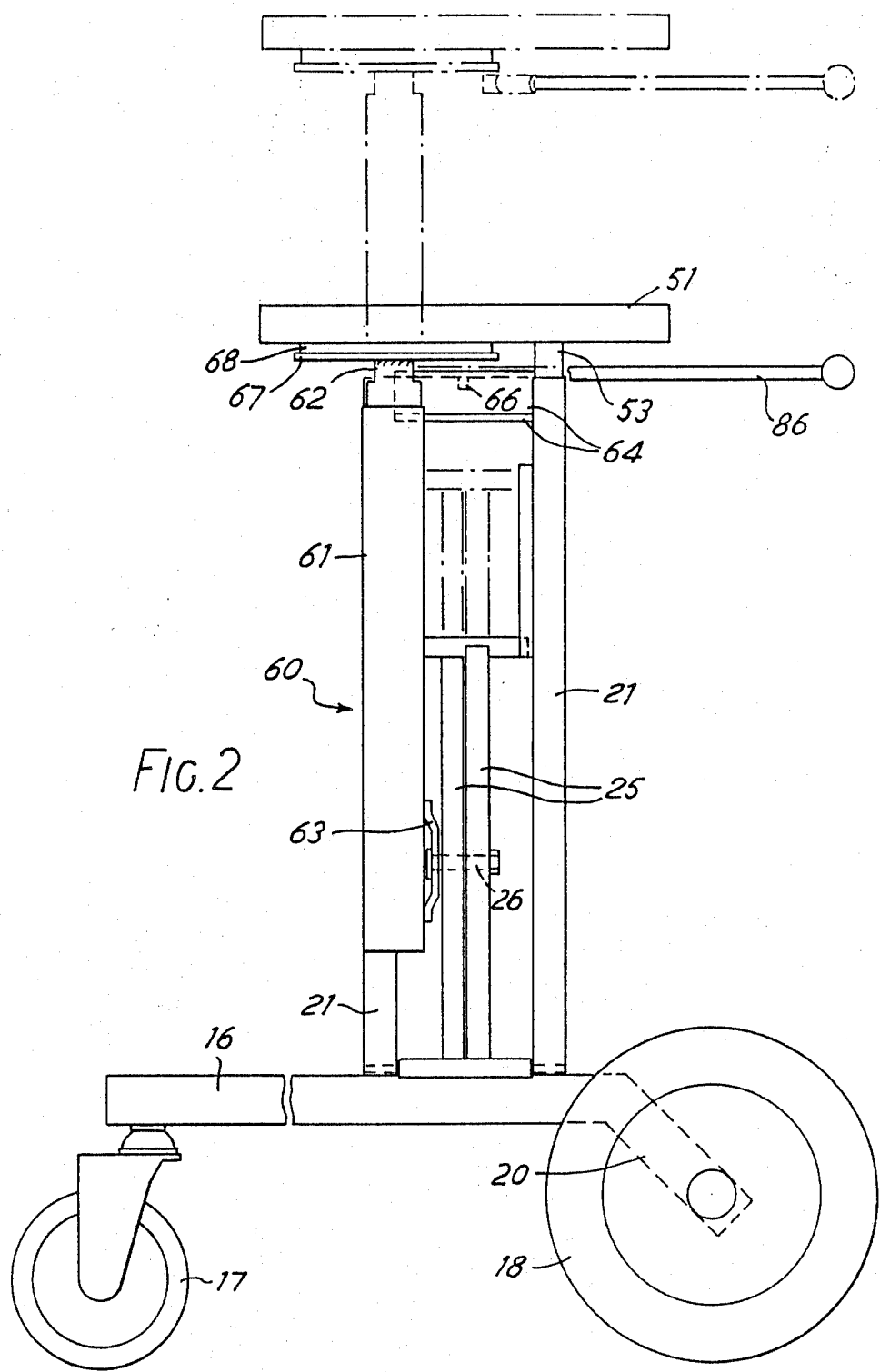
FIG. 2 is a side view of the trolley base with one form of lifting means.
Figure 3:
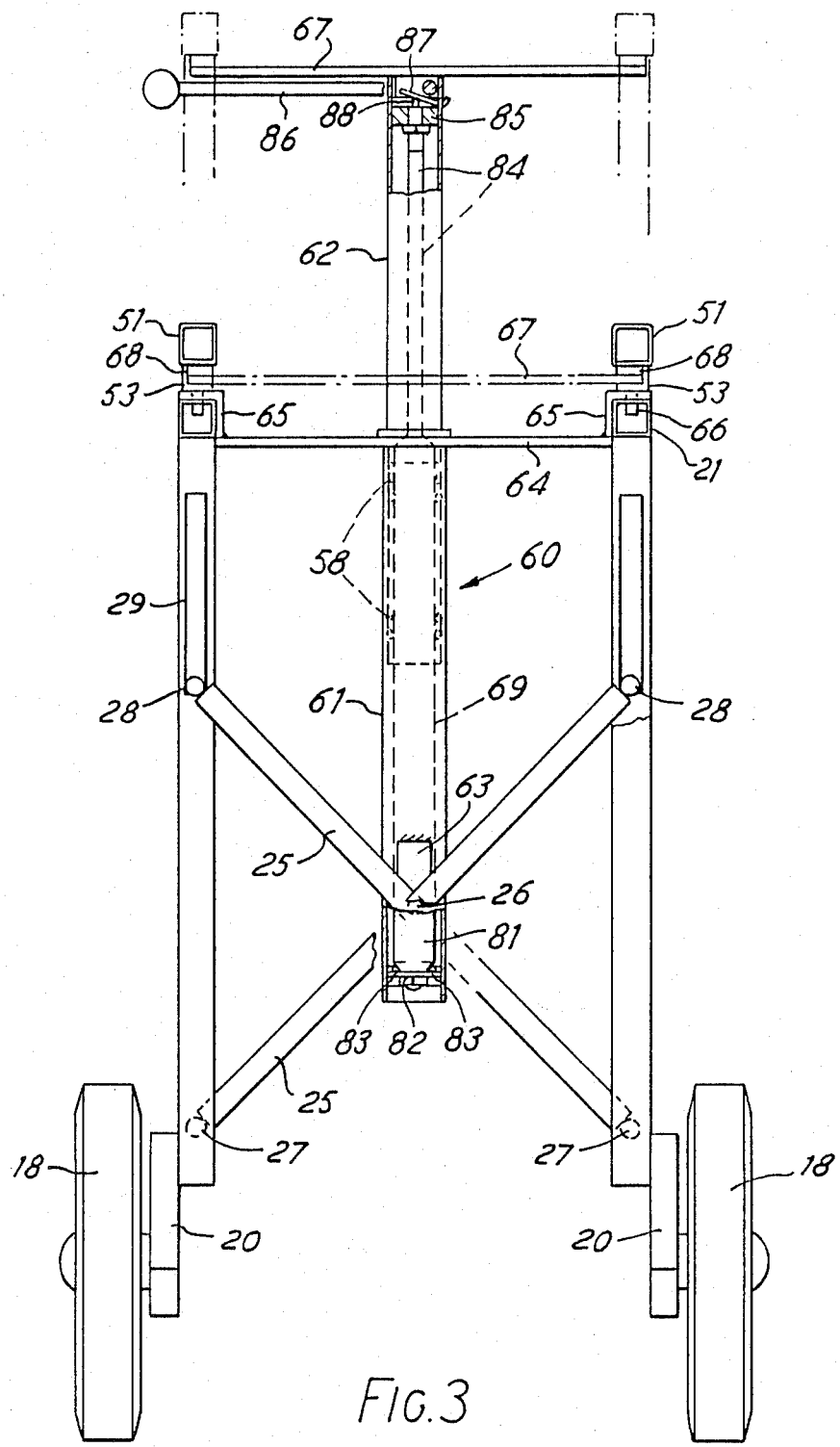
FIG. 3 is a rear view of the trolley base of FIG. 2.

The strut 69 of FIGS. 2 and 3 is a lockable pre-loaded gas strut (e.g. as made by Stabilus G.m.b.H. West Germany) designed to lift a load of for example 75 kilos. Preferably it is pre-loaded to lift a load within + or −20% of the expected load (including the trolley top 52 and upper portions 51,53 of the sides of the trolley base).

The gas strut has a cylinder 81 connected to the base of the outer tube 61 via a plate 82 and bolts 83, and a piston rod 84 screw threaded to a plate 85 at the top of the inner tube 62. This allows the gas strut to be disconnected from and removed from the column and replaced by another strut. Preferably a plurality of gas struts are provided which have different pre-loadings from one another.

A handle 86 pivotally connected to the top of the inner tube 62 is rotatable about the piston axis to depress a plate 87 which acts on a lock release pin 88 of the gas strut to allow controlled expansion of the strut.

To raise or lower the trolley base the handles 57 are moved to release the locating pins. The handle 86 is moved to release the lock on the strut, the strut is allowed to expand to approximately the required height, the handles 57 are moved to their locating positions and the load height adjusted until the locking pins locate in a locked position and then the handle 86 is again moved to lock the strut.

Figure 4:
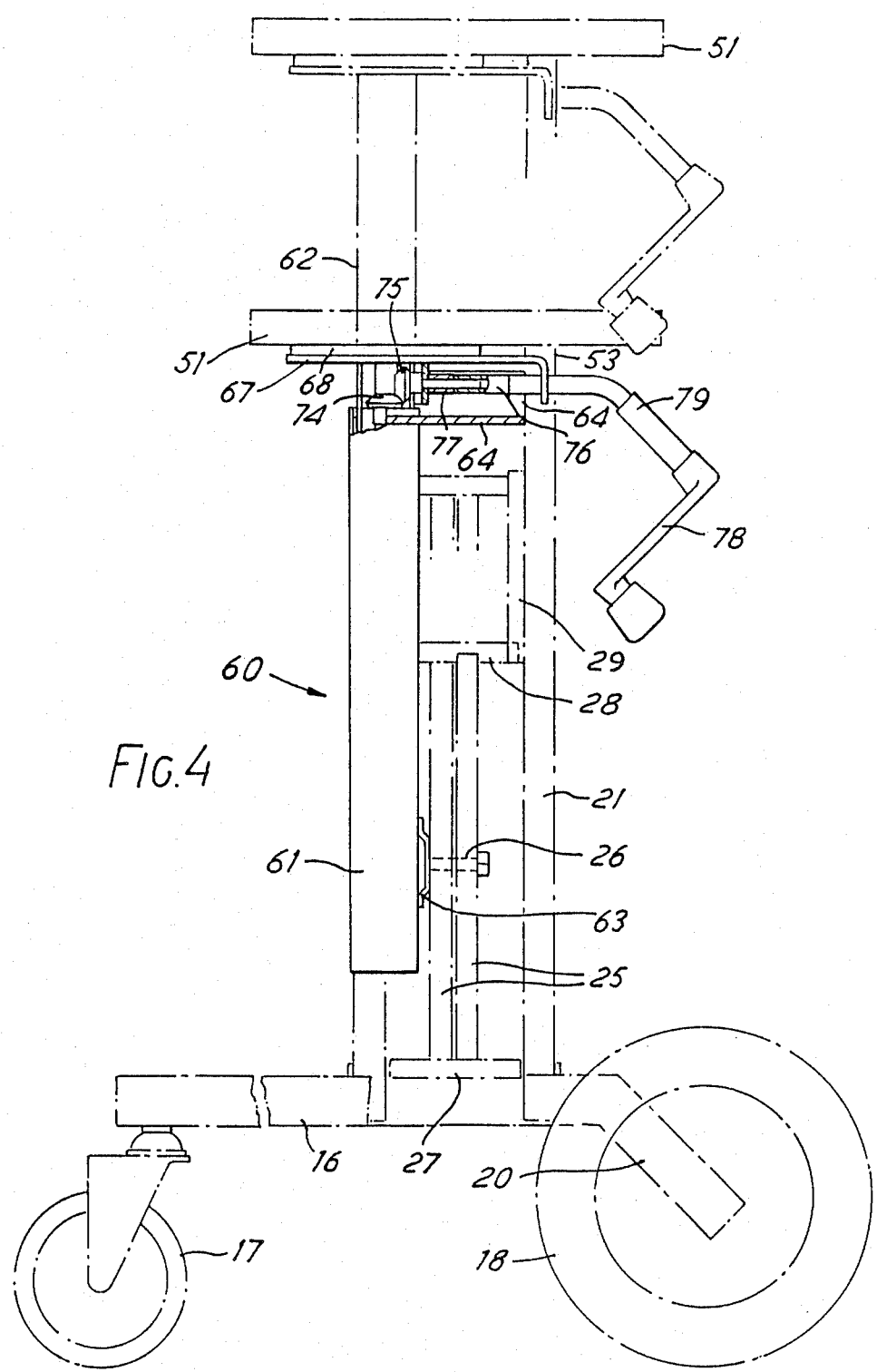
FIG. 4 is a side view of a trolley base with an alternative form of lifting means.
Figure 5:
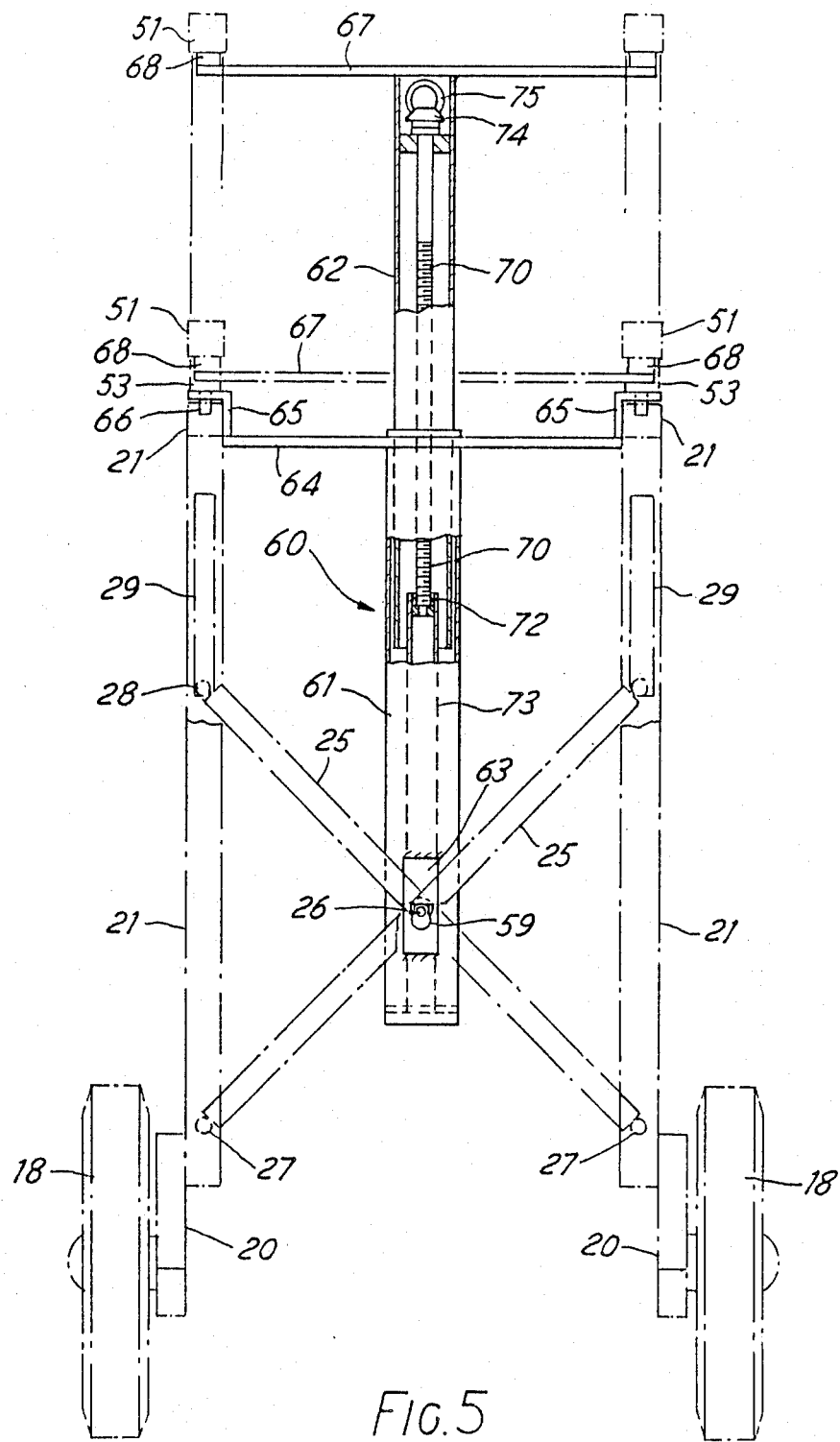
FIG. 5 is a rear view of the trolley of FIG. 5.

The strut of FIGS. 4 and 5 has a threaded rod 70 attached to the inner tube 62 and engagable with a threaded nut 72 carried by a sleeve 73 connected to the outer tube 61 so that rotation of the rod expands and contracts the strut and thus the column. The rod carries a bevel gear 74 engagable with a gear 75 carried by a cranked arm 76 mounted in bearings 77 supported by the bridging platform 67. A handle 78 is engagable with the end 79 of the cranked arm to turn the gear 75. The arrangement has sufficient mechanical advantage that turning of the handle 78 will allow controlled lifting and lowering of the crossbars 51 and thus the load. It will be appreciated that other forms of extensible strut may be used.

We claim:

1. In combination, a foldable trolley base having a folded position and an unfolded, erected working position, and comprising a base means, a load supporting means and two side members adjustable in height and connecting the base means and the load supporting means, the side members each having a lower portion and an upper portion, each upper portion forming part of the load supporting means and being movable vertically relative to its lower portion to effect height adjustment of the side member, the lower portions of the side members being connected to one another by cross members having central portions pivotally connected to one another by a pivot member, the side members being adjacent one another when the trolley base is in the folded condition and spaced apart from one another when the trolley base is in the unfolded, erected working position, and a completely detachable lifting attachment for lifting the load support means with respect to the base means, the lifting attachment comprising an expansible guide column and an extensible strut means connected with the guide column such that extension of the strut means expands the column, the guide column having a lower portion and an upper portion and a bridging member connected to the upper portion, the lifting attachment having detachable fastening means for attachment to and detachment from the trolley base, whereby the lifting attachment is attachable to the trolley base in its unfolded, erected working position with the bridging member connected to the guide column and detachably connected to each of the side members.

2. A combination according to claim 1 in which the expansible guide column is arranged to be located substantially in a central plane equidistant between the sides of the trolley base in its erected condition.

3. A combination according to claim further comprising a second bridging member attached to the extensible strut arranged to engage with and support the load supporting means in the unfolded, erected working position.

4. A combination according to any of claims 1 in which the strut means has an inter-engaging threaded parts and including inter-engaging gears connected to one of said threaded parts for relatively rotating the threaded parts to expand and contract the strut means.

5. A combination according to any of claims 1 in which the strut means is a gas strut pre-loaded to expand.

6. A combination according to any of claims 1, 2 and 3 in which the strut means is a gas strut pre-loaded to lift a load which is plus or minus 20% of the expected load.

7. A combination according to any of claims 1 in which the lifting means includes a plurality of pre-loaded gas struts, the struts having different loadings from one another and in which each strut is disconnectible from the column and replaceable by another strut.

8. A combination according to any of claims 1 in which the guide column comprises telescopically interfitting tubes having cross sections which prevent relative rotation.

* * * * *